(12) United States Patent
Toth (10) Patent No.: US 10,018,272 B2
(45) Date of Patent: Jul. 10, 2018

(54) SCAVENGER PUMP SEAL AND RADIAL SHAFT SEAL ASSEMBLY THEREWITH

(71) Applicant: Federal-Mogul Corporation, Southfield, MI (US)

(72) Inventor: David M. Toth, Brighton, MI (US)

(73) Assignee: Federal-Mogul LLC, Southfield, MI (US)

( * ) Notice: Subject to any disclaimer, the term of this patent is extended or adjusted under 35 U.S.C. 154(b) by 806 days.

(21) Appl. No.: 14/216,640

(22) Filed: Mar. 17, 2014

(65) Prior Publication Data

US 2014/0265152 A1   Sep. 18, 2014

Related U.S. Application Data

(60) Provisional application No. 61/788,190, filed on Mar. 15, 2013.

(51) Int. Cl.
| | |
|---|---|
| F16J 15/32 | (2016.01) |
| F16J 15/3204 | (2016.01) |
| F16J 15/3256 | (2016.01) |
| F16J 15/16 | (2006.01) |
| F16J 15/324 | (2016.01) |
| F16J 15/3244 | (2016.01) |

(52) U.S. Cl.
CPC ........ *F16J 15/3204* (2013.01); *F16J 15/164* (2013.01); *F16J 15/324* (2013.01); *F16J 15/3244* (2013.01); *F16J 15/3256* (2013.01)

(58) Field of Classification Search
CPC .. F16J 15/3232; F16J 15/3464; F16J 15/3456; F16J 15/3268
See application file for complete search history.

(56) References Cited

U.S. PATENT DOCUMENTS

| | | |
|---|---|---|
| 3,601,225 A | 8/1971 | Wahl, Jr. et al. |
| 3,608,910 A | 9/1971 | Tyler et al. |
| 4,209,178 A | 6/1980 | MacKenzie |
| 4,406,459 A | 9/1983 | Davis et al. |
| 4,406,460 A | 9/1983 | Slayton |

(Continued)

FOREIGN PATENT DOCUMENTS

GB    2077371 A    12/1981

OTHER PUBLICATIONS

International Search Report dated Jul. 22, 2014 (PCT/US2014/030149).

*Primary Examiner* — Matthieu F Setliff
*Assistant Examiner* — Thomas L Neubauer
(74) *Attorney, Agent, or Firm* — Robert L. Stearns; Dickinson Wright, PLLC (57) ABSTRACT

A scavenger pump seal and radial shaft seal assembly therewith are provided. The scavenger pump seal includes an inner case configured for fixed attachment to a shaft for conjoint rotation with the shaft and an outer case configured for fixed receipt in a housing in which the shaft rotates. The inner case has an innermost wall sized for a press fit on the shaft and an outermost wall. An absorbent member is fixed to the inner case with the outermost wall overlying the absorbent member, thereby preventing the absorbent member from moving radially outwardly. The outer case has an outermost wall sized for fixed receipt in the housing, and facilitates preventing the egress of oil to the external environment.

18 Claims, 8 Drawing Sheets

(56) References Cited

U.S. PATENT DOCUMENTS

| | | | |
|---|---|---|---|
| 5,028,205 A | 7/1991 | Kapadia et al. | |
| 5,154,576 A | 10/1992 | Dorski et al. | |
| 5,464,227 A | 11/1995 | Olson | |
| 6,257,587 B1 * | 7/2001 | Toth | F16J 15/3256 |
| | | | 277/309 |
| 6,336,637 B1 | 1/2002 | Fedorovich | |
| 6,702,295 B1 | 3/2004 | Kapcoe | |
| 6,726,214 B2 | 4/2004 | Fedorovich | |
| 6,729,477 B2 * | 5/2004 | Yates | B01D 27/005 |
| | | | 210/443 |
| 7,147,229 B2 * | 12/2006 | Madigan | F16J 15/3268 |
| | | | 277/551 |

* cited by examiner

SCAVENGER PUMP SEAL AND RADIAL SHAFT SEAL ASSEMBLY THEREWITH

CROSS-REFERENCE TO RELATED APPLICATION

This application claims the benefit of U.S. Provisional Application Ser. No. 61/788,190, filed Mar. 15, 2013, which is incorporated herein by reference in its entirety.

BACKGROUND OF THE INVENTION

1. Technical Field

This invention relates generally to dynamic oil seals, and more particularly to radial shaft seals.

2. Related Art

Dynamic radial shaft oil seals are designed to have a so-called "oil-side" of the seal and an "air-side." These designations pertain to the orientation of the seal when installed, with the oil-side facing the interior of the housing and being in communication with the oil, whereas the air-side faces outwardly and is exposed to the air.

During use, it is desirable to keep dust and other contaminants on the air-side of the seal while maintaining lubrication on the oil-side of the seal. It is known to incorporate spiral grooves in a seal lip to pump lubrication back to the oil-side of the seal, however, these grooves are not infallible. When oil flows past the grooves, it is generally free to reach the air-side of the seal, which not only depletes the oil supply, but, in addition to making an unsightly mess and further causing the build-up of dust and debris within the oil accumulated on the air-side of the seal, requires servicing and replacement of the seal, which can be costly. Accordingly, what is needed is a seal that both reliable keeps contaminants on an air-side of the seal from reaching an oil-side of the seal, while at the same time, preventing the egress of lubrication on the oil-side of the seal from reaching the air-side of the seal.

SUMMARY OF THE INVENTION

In general terms, this invention provides a scavenger pump seal for use with a radial shaft seal to return oil that leaks past the radial shaft seal back to the oil-side of the radial shaft seal, thereby preventing the oil from being depleted from the oil-side and reaching the air-side of the seal, and ultimately the outside environment.

In accordance with one presently preferred embodiment of the invention, the scavenger pump seal includes an annular slinger configured for operable attachment to a shaft for conjoint rotation therewith. An absorbent member is fixed to the annular slinger. The slinger has a wall with a portion aligned radially outwardly from and overlying the absorbent member with at least one opening in the wall through which oil contained within the absorbent member flows radially outwardly.

In accordance with another aspect of the invention, the wall of the slinger can provide a running surface along which a seal lip of a radial shaft seal runs.

In accordance with another aspect of the invention, the portion of the wall overlying the absorbent member includes a plurality of the openings.

In accordance with another aspect of the invention, the scavenger pump seal can include an annular deflector having a wall configured for operable attachment within a bore of a housing.

In accordance with another aspect of the invention, the absorbent member can be mechanically fixed to the annular slinger.

In accordance with another aspect of the invention, the annular slinger can extend axially into a u-shaped channel of the annular deflector for relative rotation therein.

In accordance with another aspect of the invention, a radial shaft seal and scavenger pump seal assembly is provided.

In accordance with another aspect of the invention, a radial shaft seal assembly is provided. The assembly includes a radial shaft seal having an outer case, a seal body attached to the outer case, and a seal lip extending radially inwardly from the seal body to form a seal between an air-side of the radial shaft seal and an oil-side of the radial shaft seal. Further, the assembly includes a scavenger pump seal having an inner case configured for fixed attachment to a shaft for conjoint rotation with the shaft and an outer case configured for fixed receipt in a housing in which the shaft rotates. The inner case has an innermost wall sized for a press fit on the shaft and an outermost wall. An absorbent member is fixed to the inner case on the air-side of said radial shaft seal with the outermost wall overlying the absorbent member to prevent the absorbent member from moving radially outwardly. The outer case has an outermost wall sized for fixed receipt in the housing on an air-side of the absorbent member to prevent oil from escaping to an outside environment

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
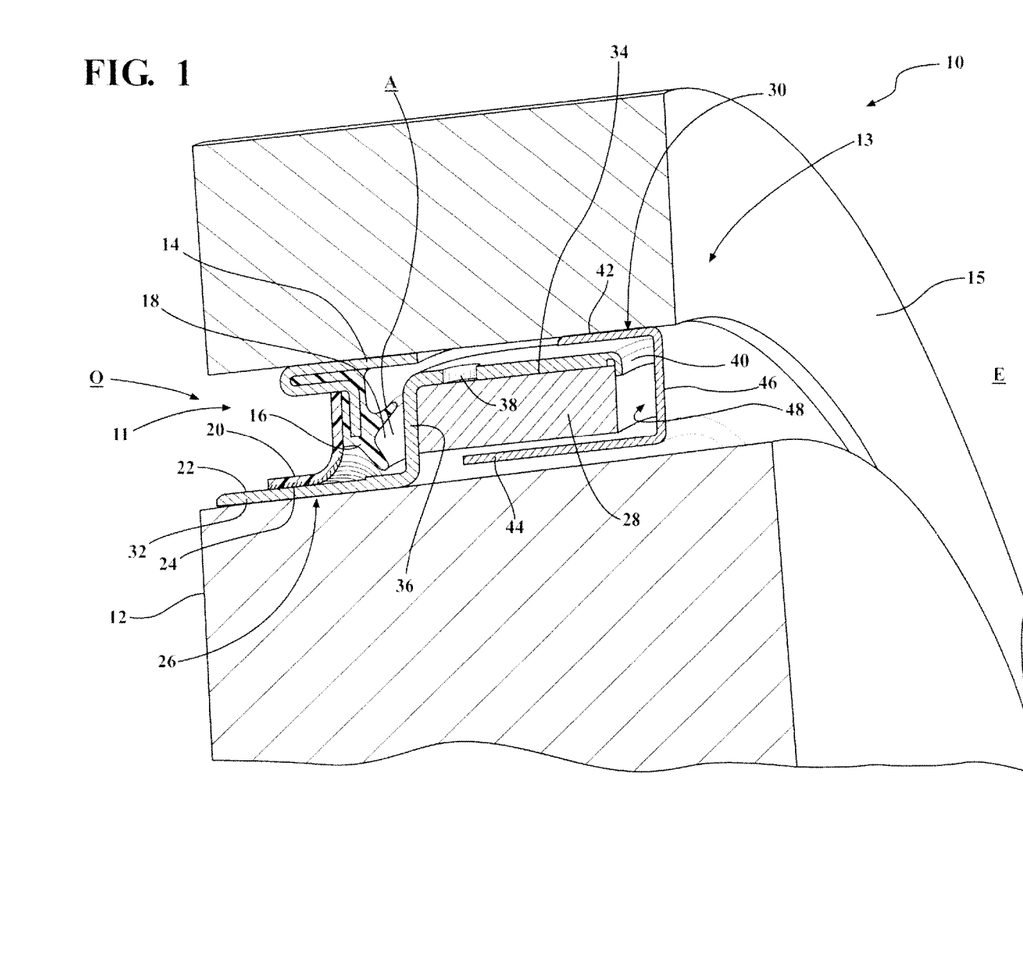
FIG. 1 is a cross-sectional perspective view of a radial shaft seal assembly with a scavenger pump seal constructed according to one aspect of the invention.
Figure 2:
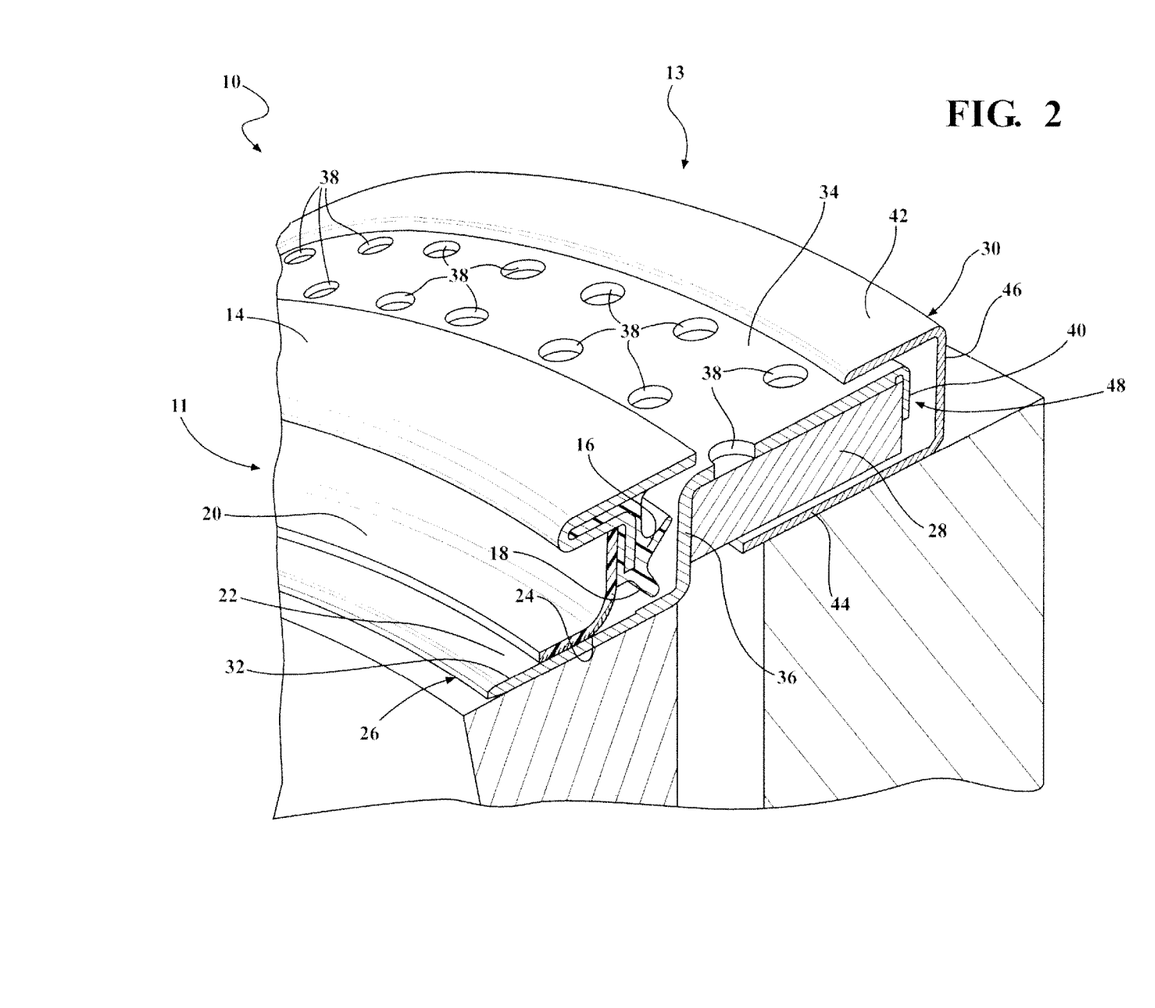
FIG. 2 is a cross-sectional view of the radial shaft seal assembly and scavenger pump seal of FIG. 1 taken from a different perspective.

Referring in more detail to the drawings, FIGS. 1 and 2 illustrate a radial shaft seal assembly 10 including a radial shaft seal 11 and a scavenger pump seal 13 constructed in accordance with one aspect of the invention. The assembly 10 is particularly suitable for use in a crankcase application, by way of example and without limitation, for sealing about a rotatable shaft, such as a crank shaft 12. The radial shaft seal 11 has an oil-side O and an axially opposite air-side A, in relation to the orientation of the radial shaft seal 11 when installed, with the oil-side O facing the interior of the application being sealed and the air-side A facing the outside environment E of the application being sealed. The scavenger pump seal 13 returns any oil that leaks past the radial shaft seal 11 from the oil-side O to the air-side A back to the oil-side O, thereby preventing the oil from being depleted from the oil-side O, thereby maintaining the desired amount of oil within the oil-side O, while also preventing oil from reaching environment E, thereby preventing an unsightly mess.

The radial shaft seal 11 can be provided having a plurality of configurations, and is shown in FIGS. 1 and 2 as includes a mounting portion, such as an outer case, also referred to as collar 14, provided as a metal or polymeric annulus or ring structure sized for a press-fit within a bore of a housing 15 with an elastomeric seal material attached thereto to form a seal body 16. The seal body 16 extends radially inwardly to provide a seal lip 18 that extends toward the air-side A. In addition to the seal lip, a separate seal lip 20 is attached to the elastic material of the seal body, such as a PTFE seal lip, by way of example, configured to extend toward the oil-side O axially along a seal wear surface, also referred to as running surface 22. The seal lip 20 has an annular inner sealing surface 24 including one or more threads for sealed engagement with the running surface 22. The threads extend helically to direct lubrication back to the oil-side O of the seal 10 when the shaft 12. It should be recognized that the radial shaft seal 11 can be configured otherwise, having more or fewer seal lips, as desired. An important aspect of the radial shaft seal 11 is that it remains fixed via the collar 14 to the housing 15 and that it have one or more seal lips to inhibit oil from leaking from the oil-side O to the air-side A, though the radial shaft seal 11 need not be infallible as a result of the scavenger pump seal 13 and its ability to return any lubrication that leaks past the radial shaft seal 11 back to the oil-side O of the radial shaft seal 11.

The scavenger pump seal 13 has a slinger, also referred to as an inner case 26, with an absorbent member 28 fixed thereto for conjoint rotation with the shaft 12 and an annular deflector, also referred to as an outer case 30, configured to be fixed with the housing 15. Accordingly, the inner case 26 and outer case 30 rotate relative with one another in use. The inner case 26 is shown in FIGS. 1 and 2 as being generally s-shaped in cross-section, including an axially extending radially innermost wall 32, an axially extending outermost wall 34 and a radially extending intermediate leg 36 interconnecting the innermost and outermost walls 32, 34, wherein the walls 32, 34 extend from the intermediate leg 36 in opposite directions from one another, thereby providing the generally s-shape. The innermost wall 32 has an inner surface sized for a line-to-line or slight interference press fit on the shaft 12, thereby fixing the inner case 26 against relative movement with the shaft 12, such that the shaft 12 and the inner case 26 rotate conjointly with one another. Further, the innermost wall 32 has an outer surface acting as the seal lip running surface 22.

The outermost wall 34 extends from the intermediate leg 36 in an opposite axial direction from the innermost wall 32. As best shown in FIG. 2, the outermost wall 34 has at least one, and preferably a plurality of through openings 38 spaced uniformly about the circumference thereof. As represented by arrow, the through openings 38 allow oil flow radially outwardly through the through openings 38 under centripetal force, such as while the shaft 12 and innermost wall 32 are rotating relative to the housing 15 and case 30. The outermost wall 34 has an outer surface sized for a radial clearance fit with the housing bore 15, thereby providing a gap therebetween. Further, to facilitate retaining the absorbent member 28 in fixed relation to the inner case 26, an annular free end of the outermost wall 34 is curled radially inwardly to for a radially inwardly extending lip 40 that mechanically captures the absorbent member 28 between the lip 40 and the intermediate leg 36 in an interference clamping fashion, thereby preventing relative rotation between the inner case 26 and the absorbent member 28.

The outer case 30 is generally u-shaped in cross-section, including an axially extending outermost wall 42, an axially extending innermost wall 44 and a radially extending intermediate leg 46 spacing the walls 42, 44 radially from one another in overlying relation. The innermost wall 44 has a radially inwardly facing inner surface sized for a slight clearance fit with the shaft 12 and a radially outwardly facing outer surface sized for a slight clearance fit with the absorbent member 28, thereby allowing the inner case 26 and absorbent member 28 to rotate freely relative to the outer case 30. The outermost wall 42 has a radially outwardly facing outer surface sized for a line-to-line or slight interference press fit within the bore of the housing 15, thereby fixing the outer case 30 against relative movement with the housing 15.

Upon assembling the scavenger pump seal 13 in the bore of the housing 15 and in its functional position relative to the radial shaft seal 11, the inner case 26 is pressed on the shaft 12 and positioned to locate the running surface 22 beneath the seal lips 18, 20 of the radial shaft seal 11 with the intermediate leg 36 of the inner case 26 remaining spaced from the radial shaft seal 11 so as to avoid friction there against. Further, the outermost wall 42 of the outer case 30 is pressed in the bore of the housing 15 to position the innermost wall 44 in a clearance fit beneath the absorbent member 28 and in a clearance fit above the shaft 12 and to fix the outermost wall 42 with the housing 15. When assembled, the intermediate leg 46 of the outer case 30 is spaced from the inner case 26 and absorbent member 28 to prevent creating friction. As such, an end region of the inner case outermost wall 34 and a portion of the absorbent member 28 are received in a slight clearance fit within a generally u-shaped annular pocket 48 of the outer case 30, thereby establishing a non-contact labyrinth therebetween.

In use, as oil eventually leaks past the seal lip or lips 18, 20 of the radial shaft seal 11, the oil comes into contact with the rotating inner case 26. Some of the oil will be directly flung radially outwardly by the outmost wall 34 of the inner case 26, wherein this oil can flow to a drain hole (not shown) at a bottom location of the engine housing 15 between the outermost wall 42 of the outer case 30 and the radial shaft seal 11, which applies to all embodiments discussed hereafter. Upon flowing into the drain hole, the oil can return to the crank case or held in a retention location. In addition, some of the leaked oil will flow over the outmost wall 34 of the inner case 26 into the annular pocket 48. Upon reaching the pocket 48, the oil can be absorbed or wicked by the absorbent, wicking member 28, e.g. open or closed cell foam or felt type material, which can be provided, cut and assembled from a strip of the absorbent material, which applies to all embodiments discussed herein. Then, as the absorbent member 28 rotates conjointly with the inner case 26, the centripetal force of the rotating absorbent member 28 causes the oil to be flung radially outwardly through the through openings 38, and from here, the oil flows to the aforementioned drain hole in the engine housing 15, as discussed above. Accordingly, the oil that leaks past the radial shaft seal 11 to the air-side A thereof is automatically returned internally within engine, and thus, back to the oil-side O, thereby being prevented from reaching the environment E. This not only prevents an unsightly mess, but also extends the useful life of the radial shaft seal 11 and engine, as well as reducing the frequency of oil additions and changes.

Figure 3:
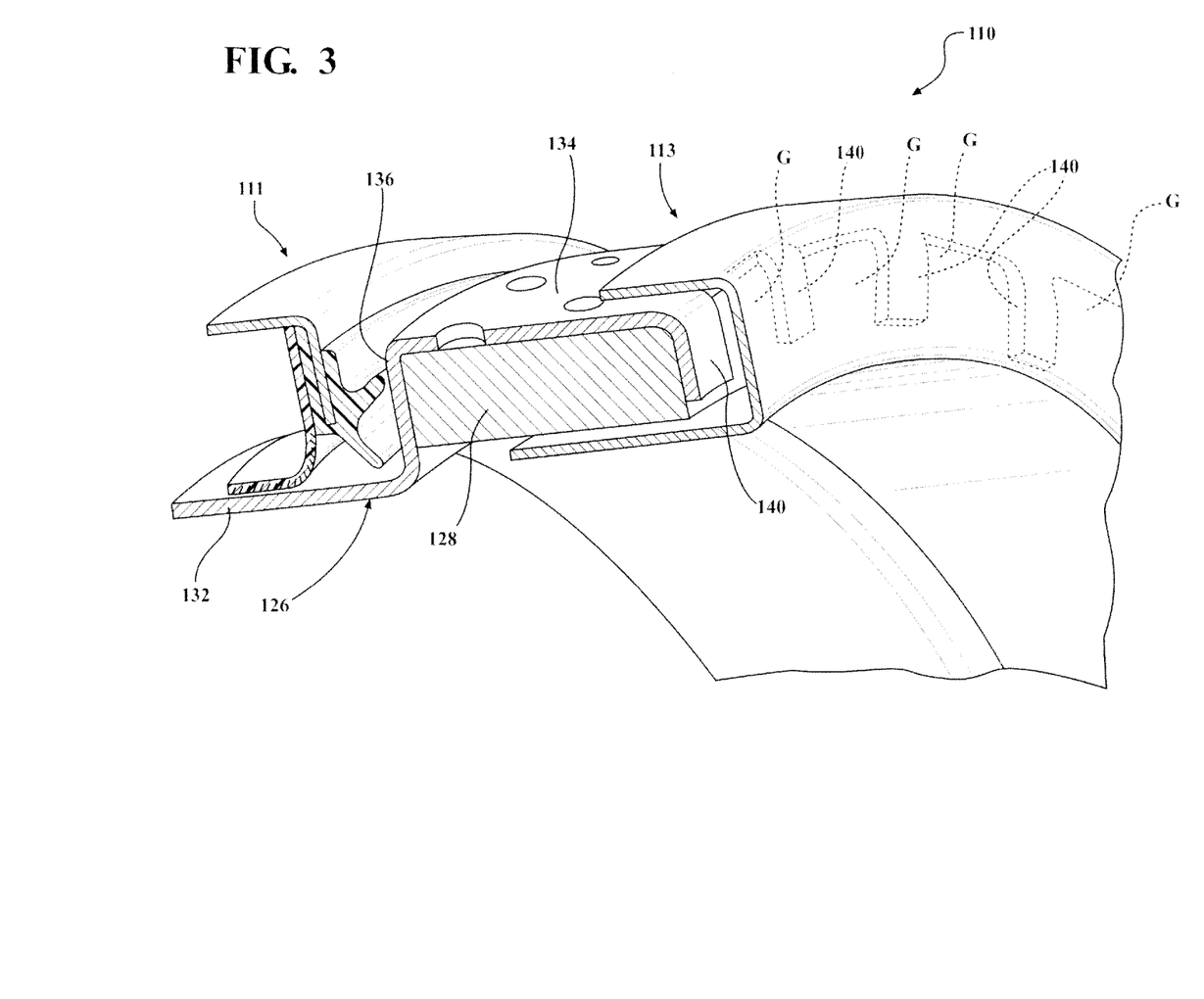
FIG. 3 is a cross-sectional perspective view of a radial shaft seal assembly with a scavenger pump seal constructed according to another aspect of the invention.

In FIG. 3, a radial shaft seal assembly 110 including a radial shaft seal 111 and a scavenger pump seal 113 constructed in accordance with another aspect of the invention is shown, wherein the same reference numerals as used above, offset by a factor of 100, are used to identify like features. The scavenger pump seal 113 is substantially similar as described above for the scavenger pump seal 13, and thus, only the notable difference is discussed further, with all remaining features remain the same. The scavenger pump seal 113 includes an inner case 126 having an innermost wall 132, an outermost wall 134 and a radially extending intermediate wall 136 connecting the inmost and outermost walls 132, 134 to one another. However, rather than retaining an absorbent member 128 with a circumferentially continuous annular lip, as discussed above, the inner case 126 has a plurality of radially inwardly extending tangs 140. The tangs 140 are folded or otherwise bent over into a capturing relation with the absorbent member 128 to retain the absorbent member 128 in fixed relation axially between the tangs 140 and a radially extending intermediate leg 136. The tangs 140 are spaced circumferentially from one another by gaps G, through which lubrication can pass for ready absorption by the absorbent member 128. Otherwise, the scavenger pump seal 113 is the same as that discussed above.

Figure 4:
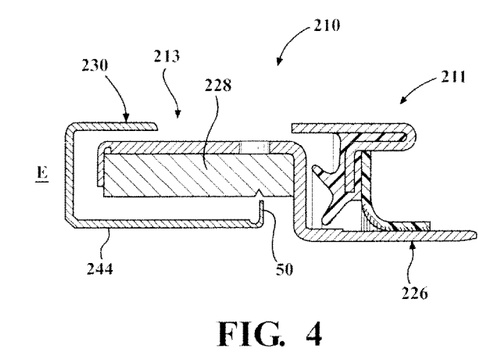
FIG. 4 is cross-sectional side view of a radial shaft seal assembly with a scavenger pump seal constructed according to another aspect of the invention.
Figure 4A:
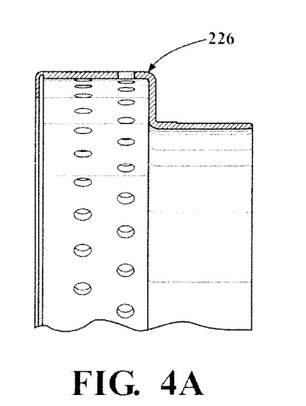
FIG. 4A is a plan view of the scavenger pump seal of FIG. 4.

In FIG. 4, a radial shaft seal assembly 210 including a radial shaft seal 211 and a scavenger pump seal 213 constructed in accordance with another aspect of the invention is shown, wherein the same reference numerals as used above, offset by a factor of 200, are used to identify like features. The scavenger pump seal 213 is substantially similar as described above for the scavenger pump seal 13, and thus, only the notable difference is discussed further, with all remaining features remain the same. The scavenger pump seal 213 includes an inner case 226 (FIG. 4A) and an outer case 230 having an innermost wall 244. However, rather than the innermost wall 244 extending axially to a free uncurled end, as in the previous embodiments, the innermost wall 244 has a radially outwardly extending end lip 50. The end lip 50 can remain spaced from the absorbent member 228, thereby preventing friction there against, or it could be brought into an interference fit, and regardless, the end lip 50 acts to prevent oil from leaking past the free end and escaping under the outer case 230 to the environment E. Otherwise, the scavenger pump seal 213 is the same as that discussed above.

Figure 5:
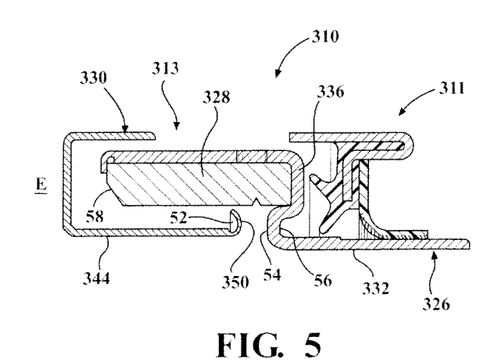
FIG. 5 is cross-sectional side view of a radial shaft seal assembly with a scavenger pump seal constructed according to another aspect of the invention.
Figure 5A:
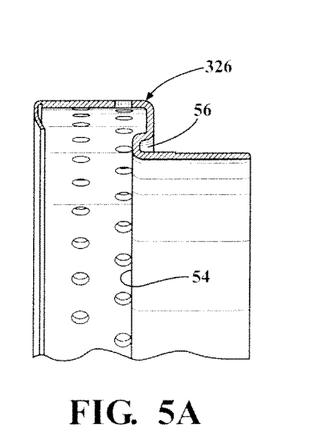
FIG. 5A is a plan view of the scavenger pump seal of FIG. 5.

In FIG. 5, a radial shaft seal assembly 310 including a radial shaft seal 311 and a scavenger pump seal 313 constructed in accordance with another aspect of the invention is shown, wherein the same reference numerals as used above, offset by a factor of 300, are used to identify like features. The scavenger pump seal 313 is substantially similar as described above for the scavenger pump seal 213, and thus, only the notable difference is discussed further, with all remaining features remain the same. The scavenger pump seal 313 includes an inner case 326 (FIG. 5A) and an outer case 330 having innermost wall 344. The innermost wall 344 has a radially outwardly extending end lip 350. The end lip 350 is shown as being slightly curled to provide an annular channel 52 to further prevent oil from escaping past the lip 350. The lip 350 remains spaced from the absorbent member 328, thereby preventing friction there against, or it could be brought into an interference fit, and regardless, acts to prevent oil from leaking past the free end and escaping under the outer case 230 to the environment E. In addition, the inner case 326 has an annular reverse folded region 54 transitioning an innermost wall 332 with an intermediate leg 336, thereby forming a recessed annular channel 56. The reverse folded region 54 extends beneath a portion of the absorbent member 328, thereby acting to further retain the absorbent member. Further yet, a lower corner 58 of the absorbent member 328 is chamfered, thereby creating an exposed, increased surface area for absorbance. Otherwise, the scavenger pump seal 313 is the same as that discussed above.

Figure 6:
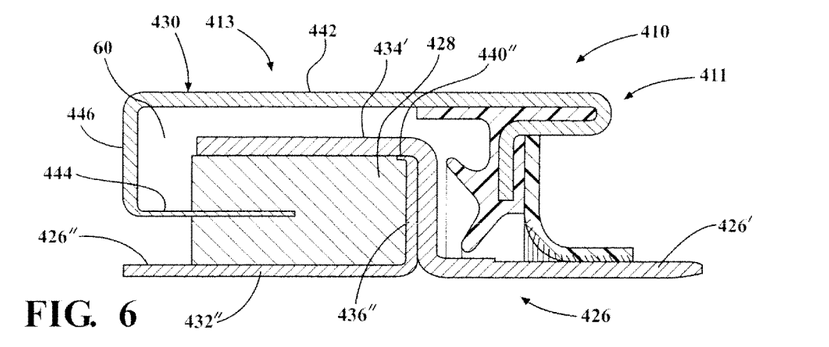
FIG. 6 is cross-sectional side view of a radial shaft seal assembly with a scavenger pump seal constructed according to another aspect of the invention.

In FIG. 6, a radial shaft seal assembly 410 including a radial shaft seal 411 and a scavenger pump seal 413 constructed in accordance with another aspect of the invention is shown, wherein the same reference numerals as used above, offset by a factor of 400, are used to identify like features. The scavenger pump seal 413 includes an inner case 426 and an outer case 430. The inner case 426 has a two part construction, including first and second inner case members 426', 426" constructed separately from one another and then fixed to one another. The first inner case member 426' is configured similar to the inner case 26 of FIG. 1, however, it does not include a lip 40 for retaining the absorbent member 428. As such, the second inner case member 426" is provided to retain the absorbent member 428 in fixed relation within the inner case 426. The second inner case member 426" includes a cylindrical innermost wall 432" and a radially outwardly extending leg 436". The cylindrical innermost wall 432" is configured to be press fit on the shaft along with the first inner case member 426' and the radially outwardly extending leg 436" is configured to be press fit within an outermost wall 434' of the first inner case member 426', and thus, both the first inner case member 426' and the second inner case member 426" rotate conjointly with the shaft and with one another. Further, the second inner case member 426" includes a curled or folded lip 440" that extends in radially overlapping relation with the inner most wall 432" to facilitate retaining the absorbent member 428 in fixed relation with the inner case 426, in addition to the absorbent member being sandwiched between the outermost wall 434' and the inner most wall 432". As such, the absorbent member 426 rotates conjointly with the inner case 426, as discussed above for the previous embodiments.

In addition, the outer case 430 includes a two part construction, with an outermost wall 442, an innermost wall 444, and an intermediate leg 446 region pressed in the outermost wall 442, or otherwise fixed thereto. As discussed above, the outermost wall 442 is configured to be fixed to the housing (not shown), and is shown as being formed as a single, monolithic piece of material with the outer case of the radial shaft seal 411. Further, unlike the previous embodiments, the innermost wall 444 does not wrap beneath the absorbent member 428, but rather, extends axially into the absorbent member 428 for relative rotational movement therein, such as in a slight clearance fit or line-to-line fit so as to minimize friction between the innermost wall 444 and the absorbent member 428. As such, by extending the innermost wall 444 into the absorbent member 428, a closed off cavity or chamber 60 is formed which prevents any leaked oil from by-passing the outer case 430 and the innermost wall 444 without first being absorbed by the absorbent member 428. Accordingly, any oil leaking past the radial shaft seal 411 is assured of being absorbed by the absorbent member 428, whereupon the oil is flung under centrifugal force radially outwardly through the through openings in the outer case 430, as discussed above, and recycled, as discussed above.

Figure 7:
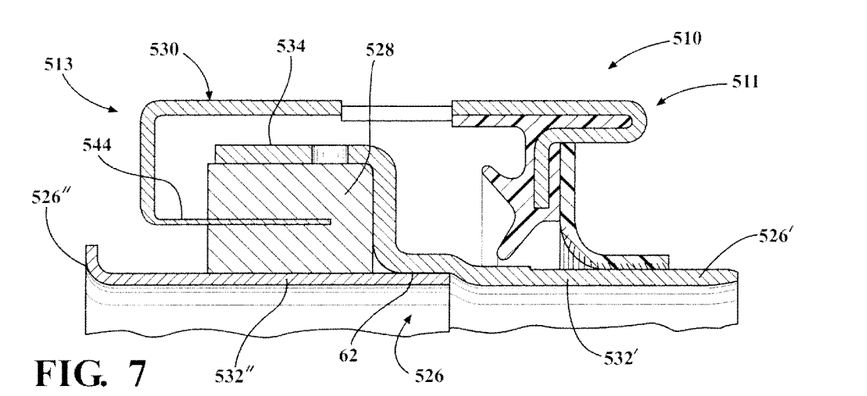
FIG. 7 is cross-sectional side view of a radial shaft seal assembly with a scavenger pump seal constructed according to another aspect of the invention.

In FIG. 7, a radial shaft seal assembly 510 including a radial shaft seal 511 and a scavenger pump seal 513 constructed in accordance with another aspect of the invention is shown, wherein the same reference numerals as used above, offset by a factor of 500, are used to identify like features. The scavenger pump seal 513 includes an inner case 526 and an outer case 530. The inner case 526 has a two part construction, as discussed above for the embodiment of FIG. 6, including first and second inner case members 526', 526". The first inner case member 526' is configured similar to the inner case 26 of FIG. 1, however, it does not include a lip 40 to facilitate retaining an absorbent member 528. Rather, the absorbent member 528 is sandwiched between an outermost wall 534 of the first inner case member 526' and a generally cylindrical innermost wall 532" of the second inner case member 526". As such, the absorbent member 528 is fixed for conjoint rotation with the first and second inner case members 526', 526" as well as with the shaft. The cylindrical innermost wall 532" is configured to be press fit within an enlarged annular counterbore 62 of an innermost wall 532' of the inner case 526, thereby fixing the first and second inner case members 526', 526" to one another against relative rotation. Accordingly, the first inner case member 526' and the second inner case member 526" rotate conjointly with the shaft, and the absorbent member 526 rotates conjointly with the inner case 526, as discussed above for the previous embodiments. Otherwise, the assembly 510 is generally the same as discussed above with regard to the assembly 410 of FIG. 6.

Figure 8:
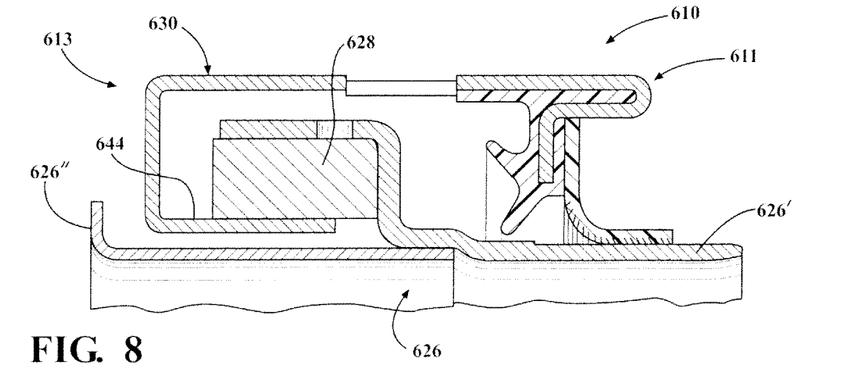
FIG. 8 is cross-sectional side view of a radial shaft seal assembly with a scavenger pump seal constructed according to another aspect of the invention.

In FIG. 8, a radial shaft seal assembly 610 including a radial shaft seal 611 and a scavenger pump seal 613 constructed in accordance with another aspect of the invention is shown, wherein the same reference numerals as used above, offset by a factor of 600, are used to identify like features. The scavenger pump seal 613 includes an inner case 626 and an outer case 630. The inner case 626 has a two part construction, as discussed above for the embodiment of FIG. 7, including first and second inner case members 626', 626". The first and second inner case members 626', 626" are configured the same as discussed above with regards to the seal assembly 510 of FIG. 7. However, the outer case 630 is configured differently from the outer case 530 of FIG. 7. Rather than the outer case 630 having an innermost wall extending into an absorbent member 628, the outer case 630 has an innermost wall 644 configured to extend axially between the absorbent member 628 and the second inner case member 626" in a slight radial clearance fit therebetween, such as discussed above with regard to the seal assembly 10 of FIG. 1. Otherwise, the assembly 610 is generally the same as discussed above with regard to the assembly 510 of FIG. 7.

Figure 9:
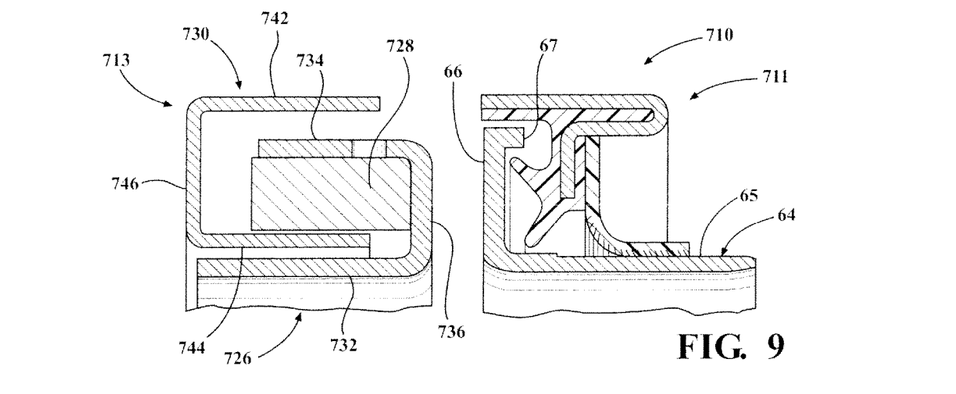
FIG. 9 is cross-sectional side view of a radial shaft seal assembly with a scavenger pump seal constructed according to another aspect of the invention.

In FIG. 9, a radial shaft seal assembly 710 including a radial shaft seal 711 and a scavenger pump seal 713 constructed in accordance with another aspect of the invention is shown, wherein the same reference numerals as used above, offset by a factor of 700, are used to identify like features. The radial shaft seal 711 and the scavenger pump seal 713 are shown as separate components spaced axially from one another along a shaft. The radial shaft seal 711 is shown disposed on a wear sleeve 64 having a cylindrical wall 65 and upstanding leg 66 extending radially outwardly from the wall 65. The wall 66 includes an annular lip 67 extending axially in overlying relation with the wall 65.

The scavenger pump seal 713 includes an inner case 726 and an outer case 730. The inner case 726 is generally c-shaped in axial cross-section having radially innermost and radially outermost annular walls 732, 734 aligned radially with one another in spaced relation as a result of an intermediate leg 736 extending therebetween. The intermediate leg 736 of the inner case 726 faces the leg 66 of the wear sleeve 64 such that the innermost and outermost walls 732, 734 of the inner case 726 extend away from the wear sleeve 64. An absorbent member 728 is fixed within the inner case 726 in abutting relation with the intermediate leg 736 between the innermost and outermost walls 732, 734. The absorbent member 728 is shown in abutting relation with the outermost wall 734 and spaced from the innermost wall 732 to provide an annular gap between the absorbent member 728 and the innermost wall 732. The outer case 730 is configured similarly as discussed above with regard to the outer case 30, and thus, has an outermost wall 742, an innermost wall 744 and an intermediate leg 746. The outermost wall 742 is configured for fixed receipt in a housing and the innermost wall 744 is configured to extend in a clearance fit within the gap between the absorbent member 728 and the innermost wall 732 of the inner case 726 to establish a labyrinth passage. The absorbent member 728 can be fixed to the inner case 726 via any suitable mechanical or adhesive mechanism, including rivets or glues, for example, which applies equally to all embodiments discussed herein and illustrated in FIGS. 1-11.

Figure 10:
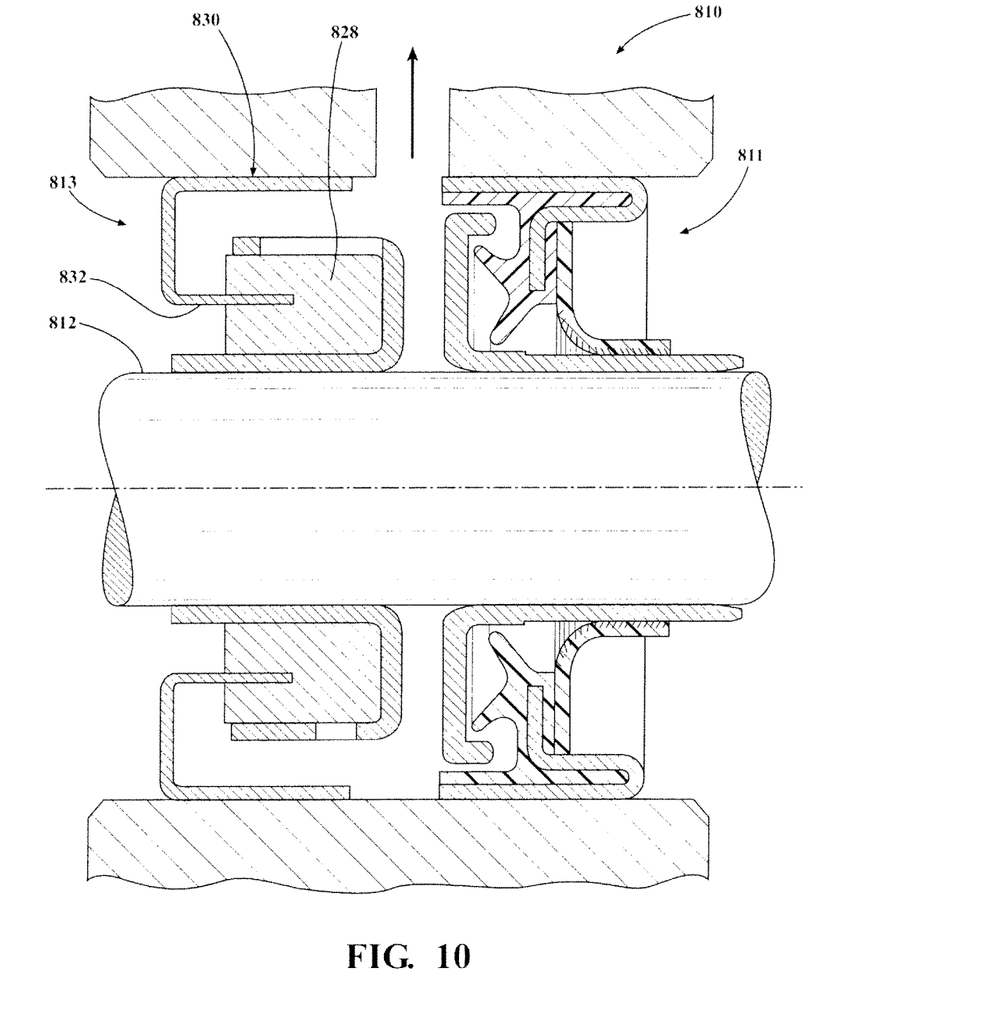
FIG. 10 is cross-sectional side view of a radial shaft seal assembly with a scavenger pump seal constructed according to another aspect of the invention.

In FIG. 10, a radial shaft seal assembly 810 including a radial shaft seal 811 and a scavenger pump seal 813 constructed in accordance with another aspect of the invention is shown, wherein the same reference numerals as used above, offset by a factor of 800, are used to identify like features. The seal assembly 810 is similar to the assembly 710, including having a radial shaft seal 811 and a scavenger pump seal 813 provided as separate components spaced axially from one another along a shaft. The notable distinction between the seal assembly 710 and the seal assembly 810 is with regard to an outer case 830 of the scavenger pump seal 813. Rather than an innermost wall 832 of outer case 830 extending axially beneath an absorbent member 828 of the scavenger pump seal 813, the innermost wall 832 extends axially into the absorbent member 828, as discussed above with regard to the scavenger pump seals 413, 513.

Otherwise, the seal assembly 810 is the same as discussed regarding the seal assembly 710.

Figure 10A:
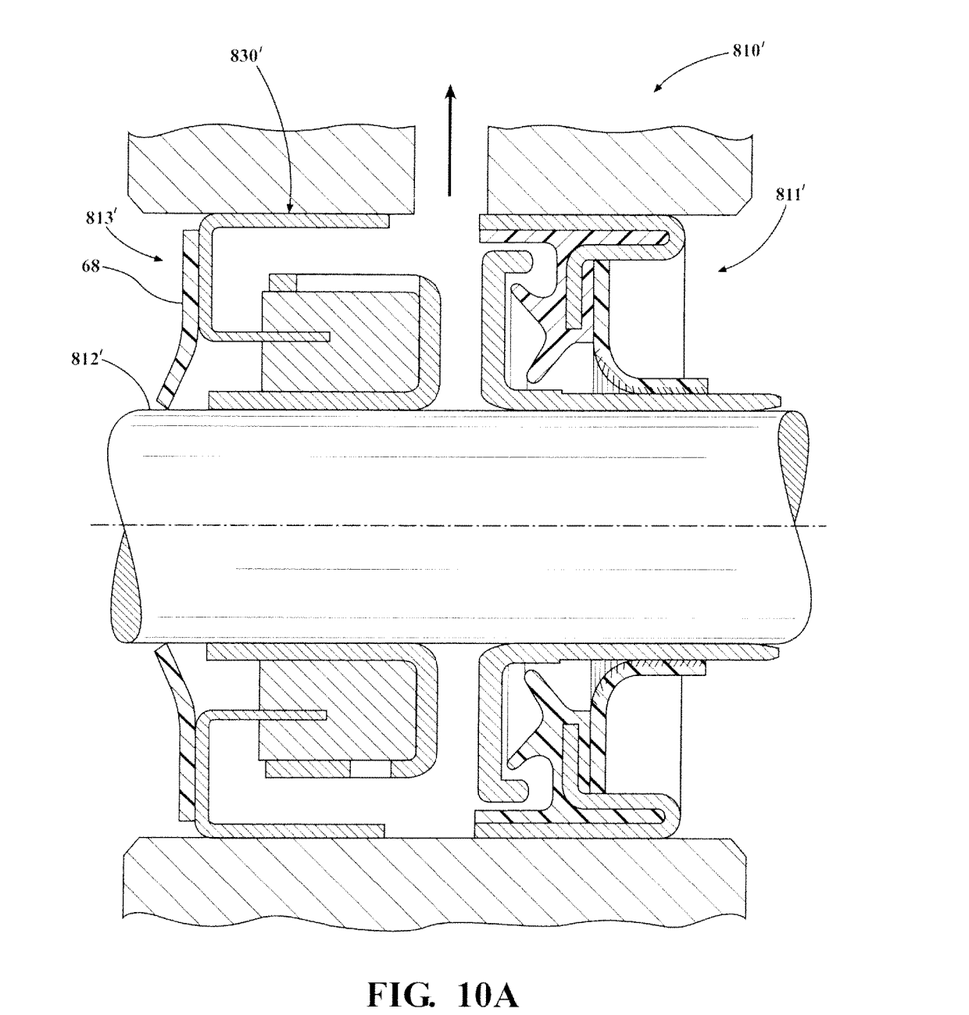
FIG. 10A is a view similar to FIG. 10 of a radial shaft seal assembly with a scavenger pump seal constructed according to another aspect of the invention.

In FIG. 10A, a radial shaft seal assembly 810' including a radial shaft seal 811' and a scavenger pump seal 813' constructed in accordance with another aspect of the invention is shown, wherein the same 800 series reference numerals as used in FIG. 10, however "primed", are used to identify like features. The seal assembly 810' is similar to the assembly 810, wherein the notable distinction between the seal assembly 810 and the seal assembly 810' is with regard to the addition of a dust lip 68 that is operably attached to an outer case 830' of the scavenger pump seal 813'. The dust lip 68 is shown as being fixed to a radially extending wall of the outer case 830' with the dust lip 68 extending radially inwardly for running contact with the shaft 812'. As such, debris is further inhibited from entering seal assembly 810'. Otherwise, the seal assembly 810' is the same as discussed regarding the seal assembly 810.

Figure 11:
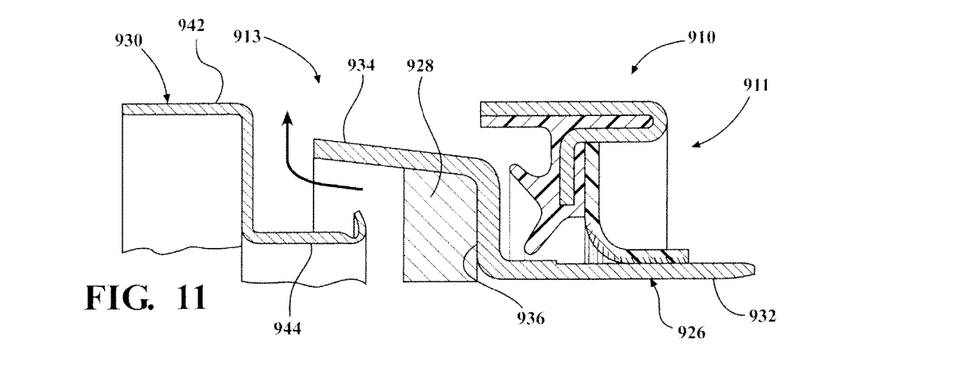
FIG. 11 is cross-sectional side view of a radial shaft seal assembly with a scavenger pump seal constructed according to another aspect of the invention.

In FIG. 11, a radial shaft seal assembly 910 including a radial shaft seal 911 and a scavenger pump seal 913 constructed in accordance with another aspect of the invention is shown, wherein the same reference numerals as used above, offset by a factor of 900, are used to identify like features. The scavenger pump seal 913 includes an inner case 926 and an outer case 930. The inner case 926 has a cylindrical innermost wall 932, a frustroconical outermost wall 934 and an intermediate leg 936 extending radially therebetween and connecting the innermost and outermost walls 932, 934 to one another. An absorbent member 928 is fixed to the inner case 926 radially inwardly from the outermost wall 934, and is shown fixed in abutment with the outermost wall 934 and the intermediate leg 936, such as via any suitable mechanical fastener or adhesive. The innermost wall 932 is configured for a press fit on a shaft such that the inner case 926 and absorbent member 928 rotate conjointly with the shaft. The outermost wall 934 diverges radially outwardly from the intermediate leg 936 to a free end. The free end of the outermost wall 934 extends in overlapping, radially spaced and aligned relation with at least a portion of an innermost wall 944 of the outer case 930, and an outermost wall 942 of the outer case 930 is configured for a press fit into a housing. As discussed above, the radial shaft seal 911 is configured to run in sealed engagement with an outer surface of the innermost wall 932, such that the innermost wall 932 functions as a wear sleeve. As the scavenger pump seal 913 rotates conjointly with the shaft, oil absorbed by the absorbent member 928 is flung radially outwardly along the frustroconical outermost wall 934 and out an annular gap formed between the free end of the outermost wall 934 and the outer case 930, whereupon the oil is returned to the engine case.

Figure 11A:
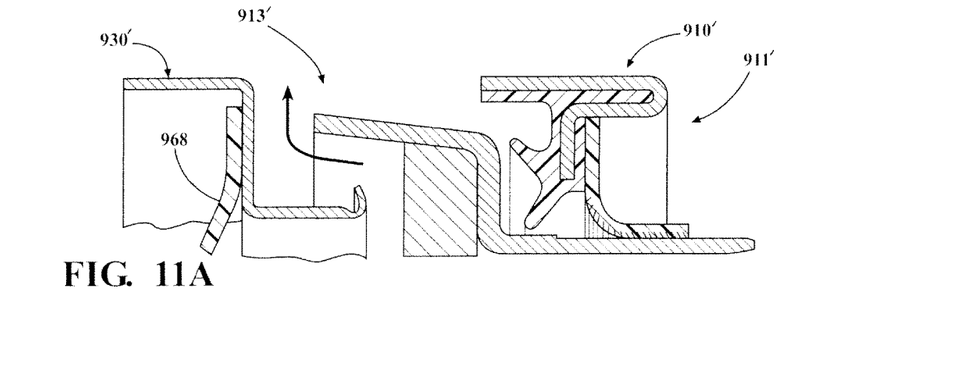
FIG. 11A is a view similar to FIG. 11 of a radial shaft seal assembly with a scavenger pump seal constructed according to another aspect of the invention.

In FIG. 11A, a radial shaft seal assembly 910' including a radial shaft seal 911' and a scavenger pump seal 913' constructed in accordance with another aspect of the invention is shown, wherein the same 900 series reference numerals as used in FIG. 11, however "primed", are used to identify like features. The seal assembly 910' is similar to the assembly 910, wherein the notable distinction between the seal assembly 910 and the seal assembly 910' is with regard to the addition of a dust lip 968 that is operably attached to an outer case 930' of the scavenger pump seal 913'. The dust lip 68 is shown as being fixed to a radially extending wall of the outer case 930' with the dust lip 968 extending radially inwardly for running contact with a shaft. As such, debris is further inhibited from entering seal assembly 910'. Otherwise, the seal assembly 910' is the same as discussed regarding the seal assembly 910.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A radial shaft seal assembly, comprising:
    a radial shaft seal having a collar, a seal body attached to said collar, and a seal lip extending radially inwardly from said seal body to form a seal between an air-side of said radial shaft seal and an oil-side of said radial shaft seal; and
    a scavenger pump seal, separate from and adjustable axially relative to said radial shaft seal, said scavenger pump seal, having an inner case configured for fixed attachment to a shaft for conjoint rotation with the shaft and an outer case configured for fixed receipt in a housing in which the shaft rotates, said inner case having a radially innermost wall sized for a press fit on the shaft and a radially outermost wall, with an absorbent member fixed to said inner case on the air-side of said radial shaft seal, such that said absorbent member and said inner case are fixed against relative rotation with one another, with said outermost wall of said inner case overlying said absorbent member in radially aligned, radial outward relation from said absorbent member to prevent said absorbent member from moving radially outwardly, said outer case having a radially outermost wall sized for fixed receipt in the housing on an air-side of said absorbent member.

2. The radial shaft seal assembly of claim 1 wherein said innermost wall of said inner case provides a running surface on which said seal lip runs.

3. The radial shaft seal assembly of claim 2 wherein said outermost wall of said inner case has a plurality of openings overlying said absorbent member in radially aligned, radial outward relation from said absorbent member.

4. The radial shaft seal assembly of claim 3 wherein said outermost wall of said outer case overlies, in radially outward relation, at least a portion of said outermost wall of said inner case in a clearance relation therewith.

5. The radial shaft seal assembly of claim 4 wherein said outer case has an axially extending, radially innermost wall extending radially inwardly of said absorbent member.

6. The radial shaft seal assembly of claim 5 wherein said outer case has an intermediate leg extending between said outermost wall of said outer case and said innermost wall of said outer case.

7. The radial shaft seal assembly of claim 6 wherein said outer case is generally u-shaped in cross-section.

8. The radial shaft seal assembly of claim 1 wherein said inner case has an intermediate leg extending between said innermost wall of said inner case and said outermost wall of said inner case, and said outermost wall of said inner case has a radially inwardly extending lip that mechanically captures said absorbent member between said lip and said intermediate leg.

9. The radial shaft seal assembly of claim 1 wherein said inner case has an intermediate leg extending between said innermost wall of said inner case and said outermost wall of said inner case, and said outermost wall of said inner case has a plurality of radially inwardly extending tabs spaced from one another by gaps, said tabs mechanically capture said absorbent member between said intermediate leg and said tabs.

10. The radial shaft seal assembly of claim 1 wherein said outer case has an innermost wall and an intermediate leg extending between said outermost wall of said outer case and said innermost wall of said outer case to form a generally u-shaped annular pocket, at least a portion of said outermost wall of said inner case and at least a portion of said absorbent member being received in said pocket.

11. A scavenger pump seal, comprising:

an inner case configured for fixed attachment to a shaft for conjoint rotation with the shaft and an outer case configured for fixed receipt in a housing in which the shaft rotates, said inner case having a radially innermost wall sized for a press fit on the shaft and a radially outermost wall, with an absorbent member fixed to said inner case, such that said absorbent member and said inner case are fixed against relative rotation with one another, with said outermost wall of said inner case overlying said absorbent member in radially aligned, radial outward relation from said absorbent member to prevent said absorbent member from moving radially outwardly, said outer case having an outermost wall sized for fixed receipt in the housing.

12. The scavenger pump seal of claim 11 wherein said outermost wall of said inner case has a plurality of openings overlying said absorbent member.

13. The scavenger pump seal of claim 12 wherein said outermost wall of said outer case overlies at least a portion of said outermost wall of said inner case in a clearance relation.

14. The scavenger pump seal of claim 13 wherein said outer case has an innermost wall extending axially beneath said absorbent member.

15. The scavenger pump seal of claim 14 wherein said outer case has an intermediate leg extending between said outermost wall of said outer case and said innermost wall of said outer case and said outer case is generally u-shaped in cross-section.

16. The scavenger pump seal of claim 11 wherein said inner case has an intermediate leg extending between said innermost wall of said inner case and said outermost wall of said inner case, and said outermost wall of said inner case has a radially inwardly extending lip that mechanically captures said absorbent member between said lip and said intermediate leg.

17. The scavenger pump seal of claim 11 wherein said inner case has an intermediate leg extending between said innermost wall of said inner case and said outermost wall of said inner case, and said outermost wall of said inner case has a plurality of radially inwardly extending tabs spaced from one another by gaps, said tabs mechanically capture said absorbent member between said lip and said tabs.

18. The scavenger pump seal of claim 11 wherein said outer case has an innermost wall and an intermediate leg extending between said outermost wall of said outer case and said innermost wall of said outer case to form a generally u-shaped annular pocket, at least a portion of said outermost wall of said inner case and at least a portion of said absorbent member being received in said pocket.

* * * * *